United States Patent
Calhoun et al.

(10) Patent No.: US 6,529,945 B1
(45) Date of Patent: Mar. 4, 2003

(54) DATA BUFFER MANAGEMENT BETWEEN TWO DIFFERENT SYSTEMS

(75) Inventors: George Michael Calhoun, Raleigh, NC (US); David Charles Sips, Efland, NC (US); Edward Stanley Suffern, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/361,079

(22) Filed: Jul. 26, 1999

(51) Int. Cl.[7] .............................. G06F 15/167
(52) U.S. Cl. .................. 709/213; 710/38; 710/40; 710/56; 365/185.33; 711/173
(58) Field of Search ............... 709/213; 710/40, 710/38, 56; 365/185.33; 711/173

(56) References Cited

U.S. PATENT DOCUMENTS

| | | | |
|---|---|---|---|
| 4,325,120 A | * 4/1982 | Colley et al. ............... 711/202 |
| 4,956,771 A | 9/1990 | Neustaedter | |
| 5,410,727 A | 4/1995 | Jaffe et al. | |
| 5,432,908 A | 7/1995 | Heddes et al. | |
| 5,459,857 A | 10/1995 | Ludlam et al. | |
| 5,469,398 A | * 11/1995 | Scott et al. ................. 365/221 |
| 5,488,734 A | 1/1996 | Bailey et al. | |
| 5,592,625 A | 1/1997 | Sandberg | |
| 5,640,349 A | * 6/1997 | Kakinuma et al. ..... 365/185.33 |
| 5,710,892 A | 1/1998 | Goodnow et al. | |
| 5,884,046 A | * 3/1999 | Antonov ...................... 709/238 |
| 5,974,518 A | * 10/1999 | Nogradi ...................... 711/173 |
| 6,112,241 A | * 8/2000 | Abdelnour et al. ......... 709/224 |
| 6,199,124 B1 | * 3/2001 | Ramakrishnan et al. ...... 710/40 |
| 6,324,669 B1 | * 11/2001 | Westby ........................ 714/805 |

OTHER PUBLICATIONS

Maha M. Zaghloul, "Buffer Management Technique," Technical Report, Mar. 1990, pp. 1–20.

* cited by examiner

*Primary Examiner*—Ayaz Sheikh
*Assistant Examiner*—Frantz B. Jean
(74) *Attorney, Agent, or Firm*—Bracewell & Patterson; Brian F. Russell

(57) ABSTRACT

A data buffer management system and method between two different types of systems, The data buffer management system employs circular buffer chaining, wherein multiple state machines service buffer updates from multiple sources, dual buffer structures are maintained, mapping is provided between two different control block structures, and full duplex operation is supported. The data buffer management system manages use of a data buffer memory. A transmit operation is performed by transferring and storing data from one of the two different systems to the data buffer memory The data in the data buffer memory is converted and read by another of the two different systems. A receive operation is performed by transferring and storing data from the other of the two different systems to the data buffer memory.

7 Claims, 8 Drawing Sheets

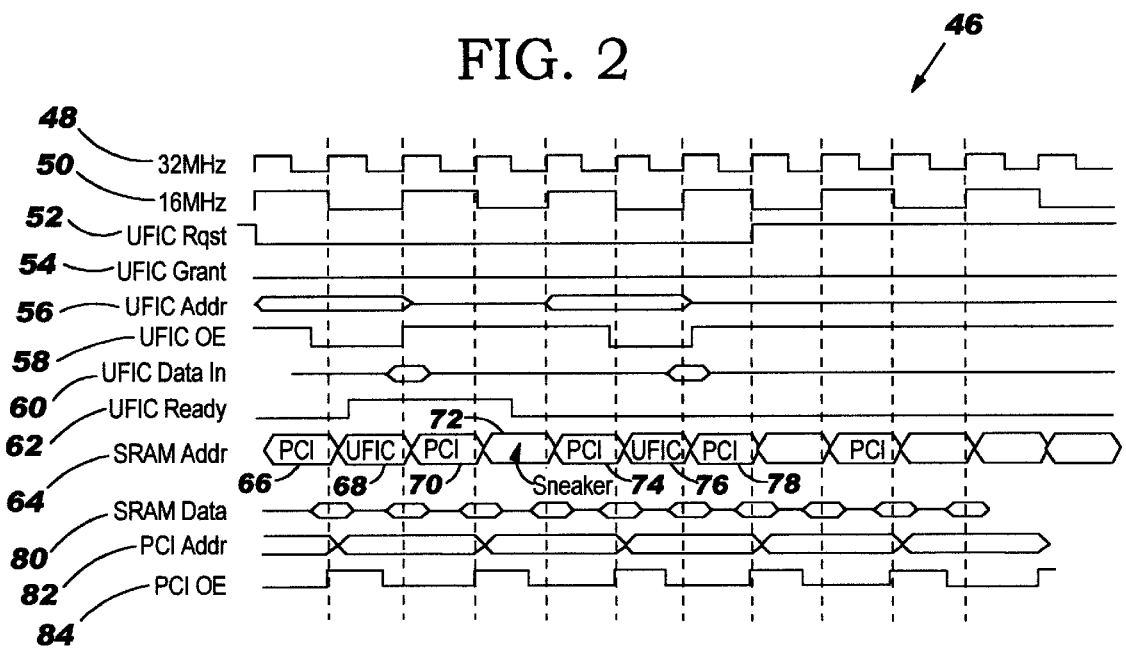
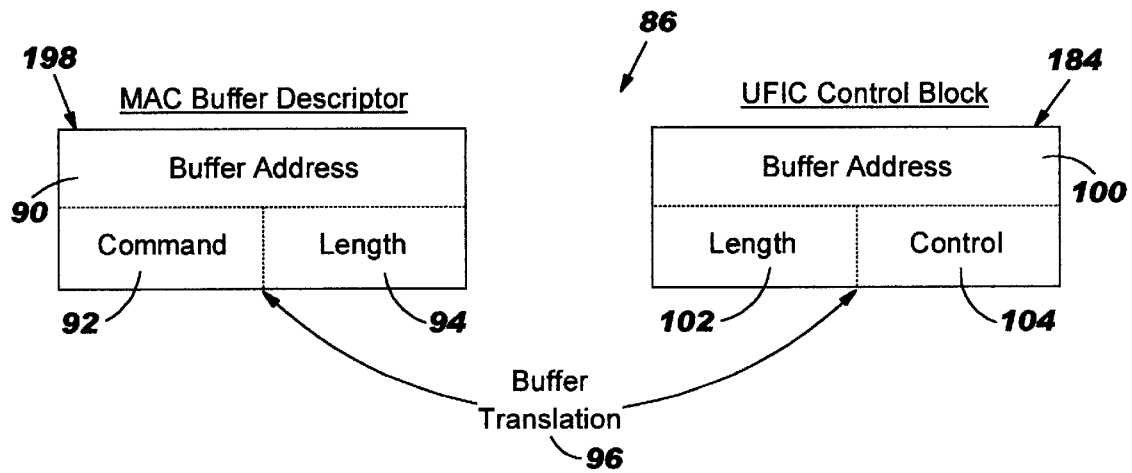

MAC = Media Access Control
HBMS = Hardware Buffer Management System

DATA BUFFER MANAGEMENT BETWEEN TWO DIFFERENT SYSTEMS

BACKGROUND OF THE INVENTION

1. Technical Field

The present invention relates in general to a transfer or conversion system and method between two different types of systems and in particular to a data buffer management system and method to allow transfers and conversions of data between the two different systems.

2. Description of the Related Art

Communications between two different types of systems have become more commonplace and/or desired in the computer field. The ability for two systems of different formats of types to be able to communicate with each other provides much more flexibility and advantages than being limited to a single format or single type system. Some transfer and conversion systems and methods for two different types of systems have been developed. These systems have involved the use of mapping of different formats. The mapping may be accomplished by having the sending device form a block of data from its buffer structure, having the target device receive this block of data, and then formatting the block of data into its buffer structures. The data transfer efficiently places in memory a plurality of buffers so that multiple processors have access to the same data. Memory requirements in such systems or methods may be quite significant. U.S. Pat. No. 5,410,727 provides an example of such a system. This prior art patent is incorporated by reference herein.

Thus the same data in the buffer memory may need to be accessed by various sub-systems, such as processors, for various tasks. Systems and methods have been developed to deal with the accessing of such same data by different systems or processors. U.S. Pat. Nos. 4,956,771 and 5,592,625 provide examples of such systems and methods. These prior art patents are incorporated by reference herein.

Typically, the different systems transferring data use buffer memory to store, convert, and manage that data. The received frame data is stored in data buffers before being serviced by a processor and forwarded to the next destination. Software or computer algorithms are generally needed or used to accomplish the transfer, buffer, and mapping of the data. An efficient hardware system and/or method for accomplishing these tasks has not been developed. In other words, a system and method that use only hardware to perform the data buffer and control block mapping between the two different systems in order to efficiently transfer data does not exist at this time. Management of the data buffer memory and how it is to be structured and used needs to be accomplished in an efficient and orderly fashion. The provision of good management of the data buffer memory is a continual need and desire.

Also, the transfer and conversion of some two different types of systems do not even exist since many disadvantages and problems may exist in such transfer and conversion systems and methods.

It would therefore be advantageous and desirable to provide a data buffer management system and method between two different types of systems. It would also be advantageous and desirable to provide a system and method for transferring data between two different systems, such as a Personal Computer Interface (PCI) system and the switching fabric within a Local Area Network (LAN) system. It would further be advantageous and desirable to provide a data management system and method for handling and transferring data between the two systems wherein the system and method use only hardware to perform the data buffer and control block mapping between the two different systems in order to efficiently transfer data. It would still further be advantageous and desirable to improve the data buffer memory usage for data transfer and conversion by providing and managing a circular buffer chaining structure in hardware for the two different systems and by translating the buffer structure from one system to another system. It would also be advantageous and desirable to provide a system and method for transferring data between two different systems that provides the following features and as advantages: 1) multiple state machine design to efficiently service buffer updates from multiple sources; 2) maintenance of dual buffer structures; 3) mapping between two different control block structures; 4) high speed full duplex data operation.

SUMMARY OF THE INVENTION

It is therefore one object of the present invention to provide a data buffer management system and method between two different types of systems.

It is another object of the present invention to provide a system and method for transferring data between two different systems, such as a Personal Computer Interface (PCI) system and the internal switching fabric of a Local Area Network (LAN) system.

It is still another object of the present invention to provide a data management system and method for handling and transferring data between the two systems wherein the system and method use only hardware to perform the data buffer and control block mapping between the two different systems in order to efficiently transfer data.

It is still a further object of the present invention to improve the data buffer memory usage for data transfer and conversion by providing and managing a circular buffer chaining structure in hardware for the two different systems and by translating the buffer structure from one system to another system.

It is also another object of the present invention to provide a system and method for transferring data between two different systems that provides the following features and advantages: 1) multiple state machine design to efficiently service buffer updates from multiple sources; 2) maintenance of dual buffer structures; 3) mapping between two different control block structures; 4) high speed full duplex data operation.

The foregoing objects are achieved as is now described. A data buffer management system and method between two different types of systems. Transfer of data between two different systems, such as a Personal Computer Interface (PCI) system and the internal switching fabric of a Local Area Network (LAN) system, is provided. Only hardware is used to perform mapping and efficient data transfer between the two different systems. A circular buffer chaining structure is maintained and managed in hardware for the two different systems. The present system and method provides: 1) multiple state machine design to efficiently service buffer updates from multiple sources; 2) dual buffer structures are maintained; 3) mapping between two different control block structures; 4) high speed full duplex data operation. A data buffer management system is coupled to a data buffer memory wherein the data buffer management system manages use of the data buffer memory. A transmit operation is performed by transferring and storing data from one of the two different systems to the data buffer memory. The data in the data buffer memory is allowed to be converted and read by another of the two different systems. A receive operation is performed by transferring and storing data from another of the two different systems to the data buffer memory. The data in the data buffer memory is allowed to be converted and read by the one of the two different systems. The data buffer management system is used to multiplex and manage transferring and storing of the data into the data buffer memory.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 is a timing diagram for operations of the time division multiplex (TDM) memory controller in the data buffer management system of FIG. 1;

FIG. 3 is a block diagram showing the structures of the Media Access Control (MAC) buffer descriptor and the Universal Feature Interface Control (UFIC) control block and the translation of data therebetween by the present invention;

FIG. 4 is an overall block diagram of the data buffer management system of the present invention as similarly shown in FIG. 1 wherein FIG. 4 shows details of the buffer memory block and the MAC block and also shows the data flow for a transmit frame flow operation, that is, from UFIC to the MAC circuitry;

FIG. 5 is an overall block diagram of the data buffer management system of the present invention as similarly shown in FIG. 1 wherein FIG. 5 shows details of the buffer memory block and the MAC block and also shows the data flow for a receive frame flow operation, that is, from MAC to UFIC;

DETAILED DESCRIPTION OF ILLUSTRATIVE EMBODIMENT

The present invention is a data buffer management system and method between two different types of systems. Transfer of data between two different systems, such as a Personal Computer Interface (PCI) system and the internal switching fabric of a Local Area Network (LAN) system, may be needed or desired. Typically, the different systems transferring data use buffer memory to store, convert, and manage that data. The received frame data is stored in data buffers before being serviced by a processor and forwarded to the next destination.

Thus, the present invention provides a data management system and method for handling and transferring data between the two systems wherein the system and method use only hardware to perform the data buffer and control block mapping between the two different systems in order to efficiently transfer data. In the present invention, a circular buffer chaining structure is maintained and managed in hardware for the two different systems by translating the buffer structure from one system to another system. The present invention provides the following features and advantages: 1) multiple state machine design to efficiently service buffer updates from multiple sources; 2) dual buffer structures are maintained; 3) mapping between two different control block structures; 4) high speed full duplex data operation.

Figure 1:
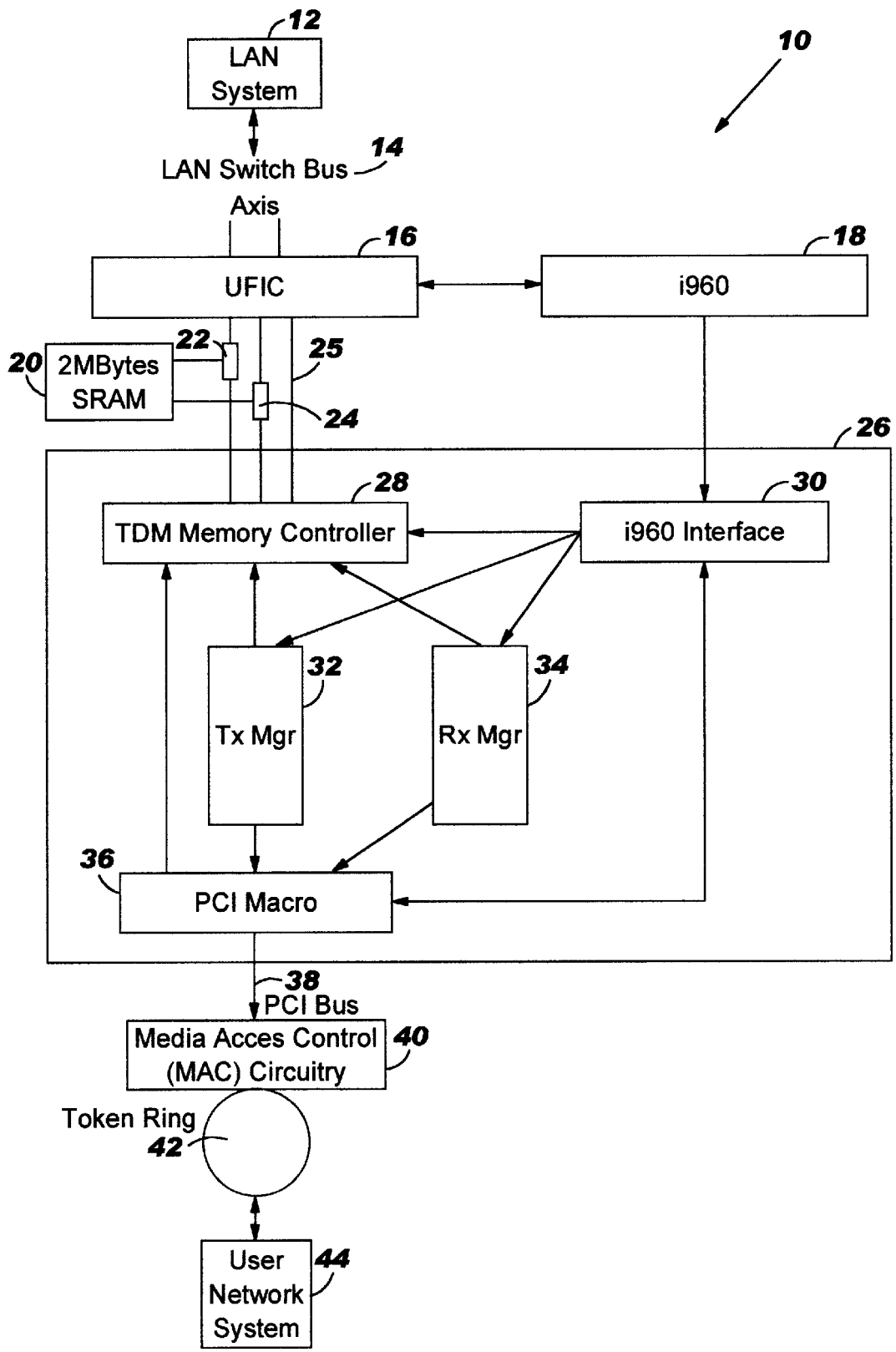
FIG. 1 is an overall block diagram of the data buffer management system between two different systems, a LAN system and a PCI system showing details of the hardware buffer management system.

With reference now to the figures and in particular with reference to FIG. 1, an overall block diagram 10 of the data buffer management between two different systems, a LAN system 12 and a user network system 44, is shown. The LAN system 12 communicates with an internal LAN switch axis bus 14. The LAN switch axis bus 14 is a LAN internal switching bus fabric having a number of ports wherein the LAN system 12 communicates through the ports. At the other end, the variable length token ring frames are received and transmitted respectively from or to the external ports that are directed to the users. These variable length token ring frames are generally stored internally as the frame length if the frames are equal to or less than the 1024 byte data buffer size. However, if the frames are larger than 1024 bytes, then the 1024 byte buffers are chained together by the hardware buffer management 26 to make up an entire frame.

The data buffer management Nigh Speed Token Ring (HSTR) UFC card 10 is coupled to the internal LAN switch axis bus 14 via the UFIC chip 16. Memory interfaces 22 and 24 exist between the UFIC chip 16, the SRAM 20, and the TDM memory controller 28 of the hardware buffer management system 26. The UFIC chip 16 is also directly coupled to the TDM memory controller 28 of the hardware buffer management system 26 via memory bus 25. The hardware buffer management system 26 maintains all the control blocks for the data buffers at the SRAM 20. An i960 initialization system 18 is coupled to the UFIC chip 16 and the i960 initialization interface 30. Two way communication exists between the UFIC chip 16 and the i960 system 18 to provide initialization communication therebetween. One way communication exists between the i960 system 18 and the i960 interface 30 to provide initialization to the hardware buffer management system 26.

The UFIC chip 16 takes data off the data LAN switch axis 14 and converts the data to be stored in the data buffer at the SRAM 20. The data buffer at the SRAM 20 has its own buffer structure, which is a circular buffer structure. The SRAM 20 has a number of addresses. The data buffer at SRAM 20 is a 2 megabyte buffer coupled to the UFIC chip 16 and to the time division multiplex (TDM) memory controller 28 of the hardware buffer management system 26. The hardware buffer management system 26 is a DMA engine transferring data between the data buffer at SRAM 20 and the front-end MAC chip 40 in 64 byte bursts. MAC chip 40 is set up as the bus master on the PCI interface (at user network system 44) with buffer control block descriptors 110 in the data buffer memory 20 (see FIGS. 4 and 5). The hardware buffer management system 26 manages two sets of control blocks in each direction (one for UFIC chip 16 and one for MAC chip 40) to effectively transfer data between MAC chip 40 and the data buffer memory 20.

Referring to FIG. 1, the hardware buffer management system 26 comprises a i960 initialization interface 30, a time division multiples (TDM) memory controller 28, a transmit manager (Tx Mgr) 32, a receive manager (Rx Mgr) 34, and a PCI macro system 36. The i960 interface 30 is coupled to the i960 initialization system 18, and one way communications is directed from the i960 interface 30 to the TDM memory controller 28, the Tx Mgr 32, and the Rx Mgr 34 to provide initialization to these sub-systems and devices. Two-way communication exists between i960 interface 30 and the PCI macro 36 to provide initialization to the PCI macro 36.

The TDM memory controller 28 communicates (two-way communications) and transmits/receives signals to and from each of the sub-systems, PCI macro 36, Tx Mgr 32, Rx Mgr 34, and i960 interface 30. Direct two-way communication exists between the TDM memory controller 28 and the PCI macro system 36. The PCI macro system 36 is a transfer mechanism. The TDM memory controller 28 boosts the performance, increases processing speed and is also used so that no data is lost between the LAN axis bus 14 and the token ring interface 42 when data is being transferred therebetween. The Tx Mgr 32 converts one buffer structure into a different buffer structure. In FIG. 1, the Tx Mgr 32 converts LAN to PCI, that is, it converts from UFIC chip 16 to MAC chip 40. The Rx Mgr 34 converts in the other direction, that is, from PCI to LAN or from MAC chip 40 to UFIC chip 16.

When data is being transferred from UFIC chip 16 to MAC chip 40, MAC chip 40 must obtain the data out of the data buffer at the SRAM 20. When data is being transferred in the other direction from MAC chip 40 to UFIC chip 16, UFIC chip 16 must then obtain the data out of the data buffer at the SRAM 20. Conversion processes from UFIC chip 16 to MAC chip 40 and from MAC chip 40 to UFIC chip 16 are occurring at the same time or simultaneously within the control block structure hardware buffer management system 26. Thus, the Tx Mgr 32 and the Rx Mgr 34 use the bus at the TDM memory controller 28 at the same time or simultaneously. Therefore, a timing diagram 46 is provided in FIG. 2 in order to coordinate the processing and operations of the TDM memory controller 28.

With reference now to the figures and in particular with reference to FIG. 2, a timing diagram 46 for the operations of the TDM memory controller 28 is shown. A timing diagram is shown for the following: a 32 MHz cycle 48, a 16 MHz cycle 50, a UFIC Request (Rqst) 52, a UFIC Grant 54, a UFIC Addr 56, a UFIC OE 58, UFIC Data in 60, UFIC Ready 62, SRAM Addr 64, SRAM data 80, PCI Addr 82, and PCI OE 84. The SRAM Addr 64 has a number of addresses. FIG. 2 shows the interleave structure for the TDM memory controller 28, and it shows how the data is interleaved in the clocking sequence. The interleave structure shows the timing sequence of the TDM memory controller 28 as PCI, UFIC, PCI, hardware buffer management, PCI, UFIC, PCI, etc. This interleave timing sequence assures high, continuous full duplex operations, that is, both ways at the same time.

Referring to FIGS. 1 and 2, hardware buffer management system 26 provides the interface translation from the 32 bit MAC PCI bus 38 to the 32 bit data buffer memory 20. Data is transferred from the MAC chip 16 to the buffer memory 20 across a 16 MHz PCI bus 38. The UFIC memory interfaces 22 and 24 each operates at 16 MHz, 62.5 nsec period to synchronize its operation with that of the axis bus 14. With only one MAC chip 40 attached to one UFIC chip 16, the buffer memory 20 must be accessed at twice the 16 MHz rate to ensure that no overruns or under runs exist when transferring data between the PCI bus 38 and the buffer memory 20. Therefore, the buffer memory 20 operates at 32 MHz, and the PCI bus 38 operates at a 16 MHz rate.

The TDM example scheme 46 of FIG. 2 at the data buffer memory 20 guarantees half of the time or cycle is reserved for the PCI to LAN data transfers (i.e. MAC to UFIC) and the other half of the time or cycle is reserved for LAN to PCI data transfers (i.e. UFIC to MAC). The operation between the PCI bus 38 and the memory interfaces 22 and 24 are synchronous, and the operation therebetween does not require the use of a large internal dual-port random access memory (RAM). Minimal buffering is required to first account for the set up time of the address 64 and count and the transfer state machines. Both the PCI bus 38 and the data buffer memory interfaces 22 and 24 are 32 bits wide. A small buffer is required as an elastic buffer to synchronize the different rates between the PCI bus 38 and the UFIC memory interfaces 22 and 24. An eight-byte buffer (two full words) has been selected as the optimal number for the data transfer elastic buffer. Bandwidth requirements for UFIC chip 16 are 160 Mbps inbound and 160 Mbps outbound. Bandwidth requirements for the PCI bus 38 is 512 Mbps instantaneous (32 bits at 16 MHz) or 200 Mbps sustained (1 port at 100 Mbps FDX). As shown in the timing diagram in FIG. 2, the buffer memory 20 is capable of two 32 bit transfers every 62.5 nsec for a bandwidth of 1024 Mbps. The memory bandwidth of 1024 Mbps is more than the PCI bus 38 plus UFIC bandwidth requirement of 832 Mbps instantaneous.

In the inbound direction, that is, from MAC chip 40 to UFIC chip 16, the micro-code initializes the MAC buffer descriptors 98 (see FIG. 6, 7, or 8) so that it can be bus master on the PCI bus interface 38. An entire frame is transferred into the data buffer memory 20 in bursts of data equal to the frame size or 1024 bytes, whichever is less. Buffer chaining is required for messages greater than 1024 bytes. The MAC buffer size is the same as the UFIC buffer size for ease of design. MAC chip 40 moves an entire frame into buffer memory 20. Hardware buffer management system 26 updates control blocks of the UFIC chip 16 as each buffer of 1024 bytes is filled. Once the entire frame has been received and these control blocks have been updated, the UFIC chip 16 is interrupted and the buffer end pointers updated. The UFIC chip 16 then transfers the frame to the LAN axis bus 14. Once the transfer to the LAN axis bus 14 is complete, then the UFIC chip 16 frees the buffers at SRAM 20 for reuse by the hardware buffer management system 26. The hardware buffer management system 26 then updates the list of the MAC buffer descriptors 198 and the UFIC control blocks 184 (see FIG. 6, 7, or 8) by freeing the buffers that were transferred by the UFIC chip 16. This transfer process will be discussed in more detail later in this specification.

In the outbound direction, that is, from UFIC chip 16 to MAC chip 40, the UFIC chip 16 stores received frames from the LAN axis bus 14 into the buffer memory 20 and updates the control blocks. An interrupt is sent from the UFIC chip 16 to the hardware buffer management system 26 each time a buffer has been loaded. These control blocks for each buffer are able to be used to form a frame of data. The hardware buffer management system 26 examines each control block 184 in sequence to determine the beginning and end of frame indications to structure the chain of buffers into a frame. Once the go entire frame is received, the MAC buffer descriptors 198 (see FIG. 6, 7, or 8) are updated, and MAC chip 40 performs a bus master operation to move the data from the data buffer memory 20 over the PCI bus 38 to its own internal buffer. When the entire frame has been transferred, both the UFIC control blocks and the MAC buffer descriptors 198 are updated. This transfer process will also be discussed in more detail later in this specification.

With reference now to the figures and in particular with reference to FIG. 3, structures of the MAC buffer descriptor 198 and the UFIC control block 184 are shown. The MAC buffer descriptor 198 comprises buffer address block 90, command block 92, and length block 94. The UFIC control block 184 comprises buffer address block 100, length block 102, and control block 104. FIG. 3 also shows buffer translation 96 between MAC buffer descriptor 198 and UFIC control block 184. The control memory is physically the same as the data buffer memory 20 so both the buffer en-queue/de-queue and data transfer operations use the same memory. Since the memory interface uses a TDM scheme 46 to guarantee memory accesses to both UFIC chip 16 and hardware buffer management system 26, the hardware buffer management system 26 uses the idle cycles not required by the UFIC data transfers to manage the control blocks. The control memory section contains a list of outbound and inbound buffers. In addition to the UFIC control buffer structure, MAC chip 40 uses a buffer mechanism with MAC buffer descriptors 198 containing basically the same information as the UFIC control blocks but in a different format. Hardware buffer management system 26 is responsible for performing the translation of these buffer structures. Hardware buffer management system 26 modifies the list of the MAC buffer descriptors 198 so they are UFIC control blocks 184 in the outbound direction (UFIC chip 16 to MAC chip 40) and performs the inverse operation in the inbound direction (MAC chip 40 to UFIC chip 16).

Hardware buffer management system 26 arbitrates its operation with the memory needs between the transmit flow and the receive flow of the UFIC chip 16. If both flow operations require the use of the memory, hardware buffer management system 26 alternates the use of the memory between the two flow operations allowing half or fifty percent of the time for each flow operation. MAC chip 40 is an adapter chip and contains large FIFO buffers. Hardware buffer management system 26 provides small elastic buffers into the data store to synchronize the data transfer over the PCI bus 38 to the memory interface of the UFIC chip 16. To minimize the store-and-forward delay of the MAC, hardware buffer management, memory, and UFIC interfaces, the MAC FIFO size is minimized before bursting data across the PCI interface 38 and into the buffer memory 20. Both these control UFIC and the MAC control blocks 184 and 198 are initialized by the microcode during the initialization process (i.e. by the i960 system 18). The control blocks 184 and 198 both use a sequential circular queue method for making these control blocks. Control block structures 184 and 198 both point to the same data buffer addresses of the frames. As shown in FIG. 3, the buffer structures of the UFIC chip 16 and MAC chip 40 are similar but not identical. A requirement exists to keep both sets of control blocks. FIG. 3 also shows the control block manipulation in the inbound direction. The outbound control block manipulation is similar.

When frames are being assembled as buffers inbound to the UFIC chip 16 from the MAC chip 40, the hardware buffer management system 26 updates each UFIC control block 184 as the frame is received. Once the entire frame is received and all the control blocks are updated, the hardware buffer management system 26 updates the end pointers and interrupts the UFIC chip 16 in advising that a frame is ready for transfer. The interrupt advises and signals UFIC chip 16 to read the updated buffer control block end pointer and begin transferring the frame to the LAN axis bus 14. As frames are received outbound, the UFIC chip 16 sends an interrupt to the hardware buffer management system 26 each time one buffer of the frame has been received and loaded into the buffer memory 20. The hardware buffer management system 26 keeps a count of the number of complete buffer interrupts received to ensure that it processes all the outbound buffers received. When the frame has been transferred, the hardware buffer management system 26 frees all the UFIC control blocks 184.

Figure 4:
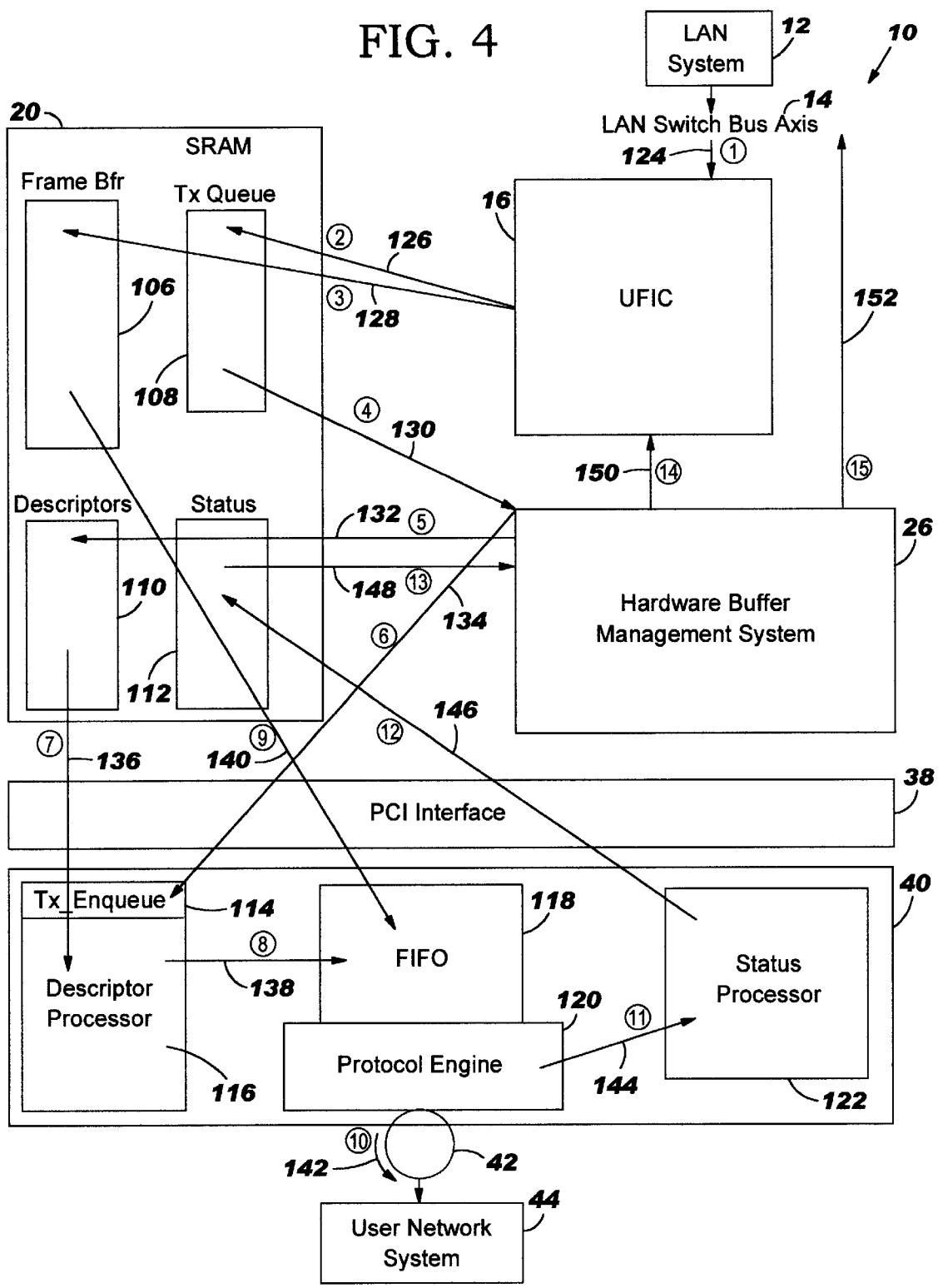
Figure 5:
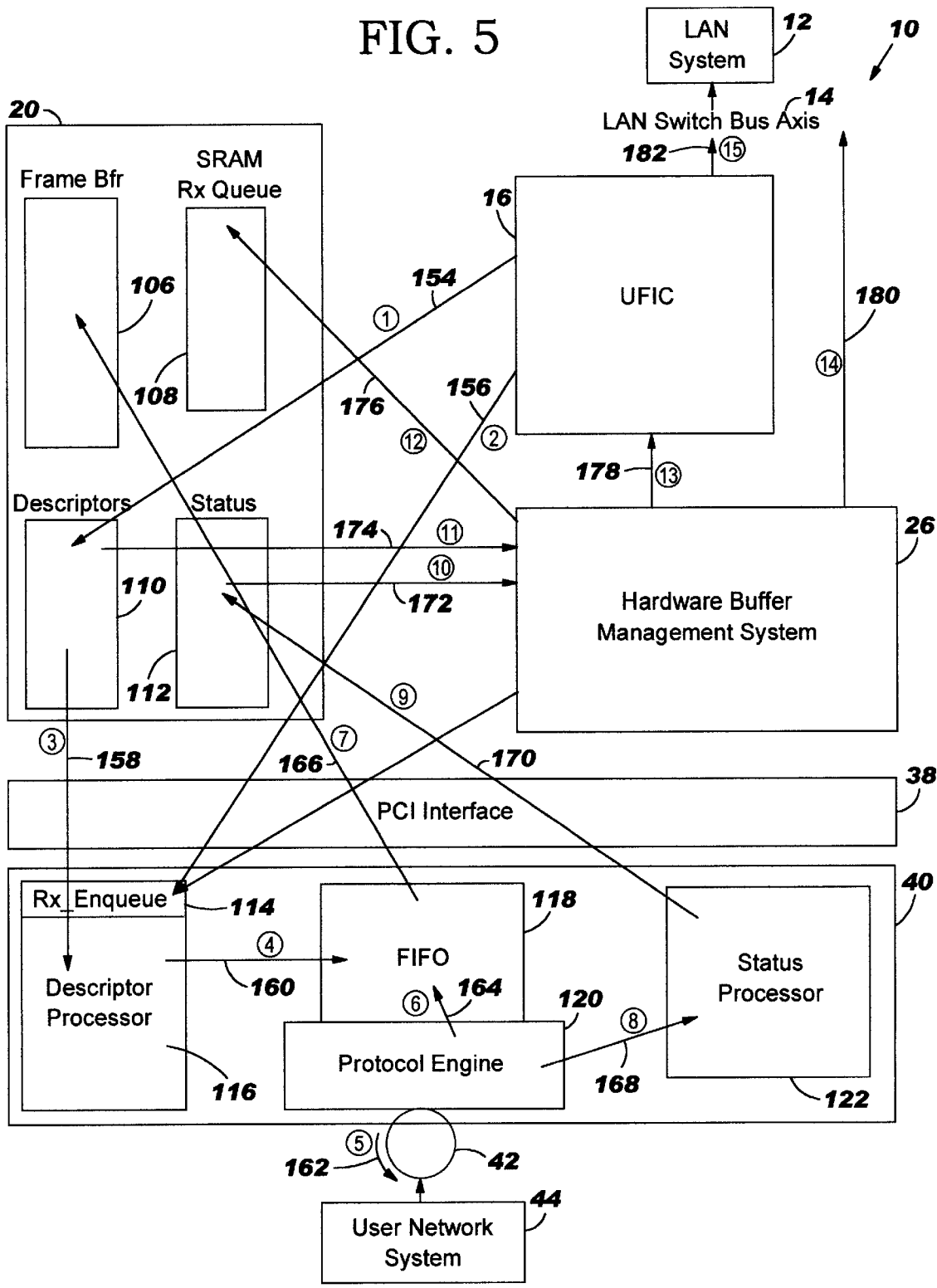

With reference now to the figures and in particular with reference to FIGS. 4 and 5, an overall block diagram 10 similar to the diagram in FIG. 1 of the data buffer management between two different systems, a LAN system 12 and a user network system 44, is shown. FIGS. 4 and 5 show more detail of the SRAM buffer memory 20 and the MAC chip 40. The SRAM buffer memory 20 is divided in four different blocks: a frame buffer block 106, a Transmit (Tx) Queue block 108, Descriptors block 110, and Status block 112. Each of these blocks hold different types of data. For example, the frame buffer block 106 holds UFIC control blocks 184. The Tx Queue 108 holds Tx control blocks. The Descriptors block 110 holds MAC buffer descriptors 198. The status queue 112 holds the status data or information. The MAC chip 40 comprises Transmit (Tx) Enqueue 114, descriptor processor 116, FIFO 118, protocol engine 120, and status processor 122.

FIG. 4 shows the data flow for a transmit (Tx) frame flow operation (i.e. outbound flow) for the data management block system 10 from the UFIC chip 16 to MAC chip 40, that is, from LAN system 12 to user network system 44. The LAN system 12 places the data frame on the LAN switch axis bus 14. The first step 124 of the operation is that the data frame is sent from the LAN axis bus 14 to the UFIC chip 16, and the UFIC chip 16 receives the data. The second step 126 involves the UFIC chip 16 placing the data frame, which is a UFIC control block 184 (see FIG. 3) into the UFIC frame buffer 106 of the SRAM buffer memory 20 (i.e. data frame (UFIC control block) parsed into buffers). The third step 128 involves the UFIC chip 16 updating the last of the transmit (Tx) control blocks in Tx Queue 108 of the SRAM buffer memory 20 regarding the data frame transmitted from the UFIC chip 16 to the frame buffer 106. The fourth step 130 involves hardware buffer management system 26 reading in the updated Tx control block from the Tx Queue 108. The fifth step 132 involves the hardware buffer management system 26 converting the updated Tx Control Block to descriptor format and putting the descriptor format information into the queue of the descriptors 110. The descriptor format information is used to translate and correlate between the UFIC control block 184 and the MAC buffer descriptor 198.

The sixth step 134 of the operation involves the hardware buffer management system 26 writing to the Tx_Enqueue register to inform and advise MAC chip 40 of the data frame in the frame buffer 106 to be converted or translated. The seventh step 136 involves the MAC descriptor processor 116 fetching the descriptor format information for the data frame from the descriptors 110 of the SRAM buffer memory 20. The eighth step 138 involves the MAC descriptor processor 116 advising the First In First Out (FIFO) buffer 118 that it is ready to transfer and convert/translate the data frame. The MAC descriptor processor 116 initiates transfer and storing of the data frame from the frame buffer 106 and uses the descriptor format information in the descriptors 110 to translate and store the data frame converted into MAC format into the FIFO buffer 118. The ninth step 140 involves the fetching and converting the data frame from the frame buffer 106 and storing the translated or converted data frame into the FIFO buffer 118. The tenth step 142 involves sending the translated or converted data frame from the FIFO buffer 118 to the token ring interface 42 and then to the user network system 44. The eleventh step 144 involves the status from the protocol engine 120 (i.e. status is "transfer complete") being posted and updated to the status processor 122 of MAC chip 40. The twelfth step 146 involves the status (i.e. "transfer complete" status) being posted and updated from the status processor 122 of MAC chip 40 to the status queue 112 of the SRAM buffer memory 20. The thirteenth step 148 involves the hardware buffer management system 26 analyzing the status in the status queue 112. The fourteenth step 150 involves the hardware buffer management system 26 freeing up the UFIC control block 184 within the frame buffer 106 and updating the UFIC end pointer 190 when the "transfer complete" status has been recognized. In the event that something were occur during the transfer or conversion process, an interrupt is posted to the i960 initialization system 18 from line 152.

FIG. 5 shows the data flow for a receive (Rx) frame flow operation (i.e. inbound flow) for the data management block system 10 from the MAC chip 40 to the UFIC chip 16, that is, from user network system 44 to LAN system 12. The first step 154 of the flow operation is to have the MAC receive descriptors 110 in the SRAM buffer memory initialized by a central processing unit (CPU). The second step 156 involves the CPU initializing the Rx_Enqueue register 114 with the maximum count. The hardware buffer management system 26 updates the Rx_Enqueue register 114 during traffic flow. The third step 158 involves the descriptors 110 in SRAM 20 being fetched by the MAC descriptor processor 116 so that the MAC chip 40 knows and realizes that the descriptors 110 in SRAM 20 have buffer space to place the data frame from the user network system 44. The fourth step 160 involves the data movement being initialized by the MAC descriptor processor 116. The MAC descriptor processor 116 tells the hardware that sufficient space is available for the data frame. The fifth step 162 receives the data frame from the user network system 44 through the token ring interface 42. The sixth step 164 involves storing the data frame from the user network system 44 into the FIFO buffer 118 in the MAC chip 40, that is, getting the data from the user network system 44 and storing it into the buffer space. The seventh step 116 involves forwarding the data frame from the FIFO buffer 118 to the frame buffer 106 of the SRAM buffer memory 20. The eighth step 168 involves sending a "transfer" status to the status processor 122 of the MAC chip 40. The ninth step 170 involves posting and sending the "transfer" status to the status queue 112 of the buffer memory 20. The status information includes the number of buffers used, the last fragment count, etc.

The tenth step 172 involves the hardware buffer management system 26 interrogating the status in the status queue 112 of the SRAM 20. The status advises that the hardware buffer management system 26 has to read the data transferred to the frame buffer 106. The eleventh step 174 involves the hardware buffer management system 26 reading the receive (Rx) descriptors 110 to figure out where the data frame is based on where the MAC chip 40 had placed and stored the data frame. The twelfth step 176 involves the hardware buffer management system 26 creating a receive control block in the receive (Rx) queue 108 for a UFIC control block 184. The thirteenth step 178 involves the hardware buffer management system 26 informing the UFIC chip 16 of the received data frame by updating the end pointer 190. The fourteenth step 180 involves determining whether the status in the status queue 112 indicated an error. If the status indicated an error, then the hardware buffer management system 26 posts and sends an interrupt to the CPU. If an error has not been indicated, the operation moves to the fifteenth step 182 where the UFIC chip 16 forwards the located data frame from the frame buffer 106 to the LAN switch bus axis 14 and to the LAN system 12.

Figure 6:
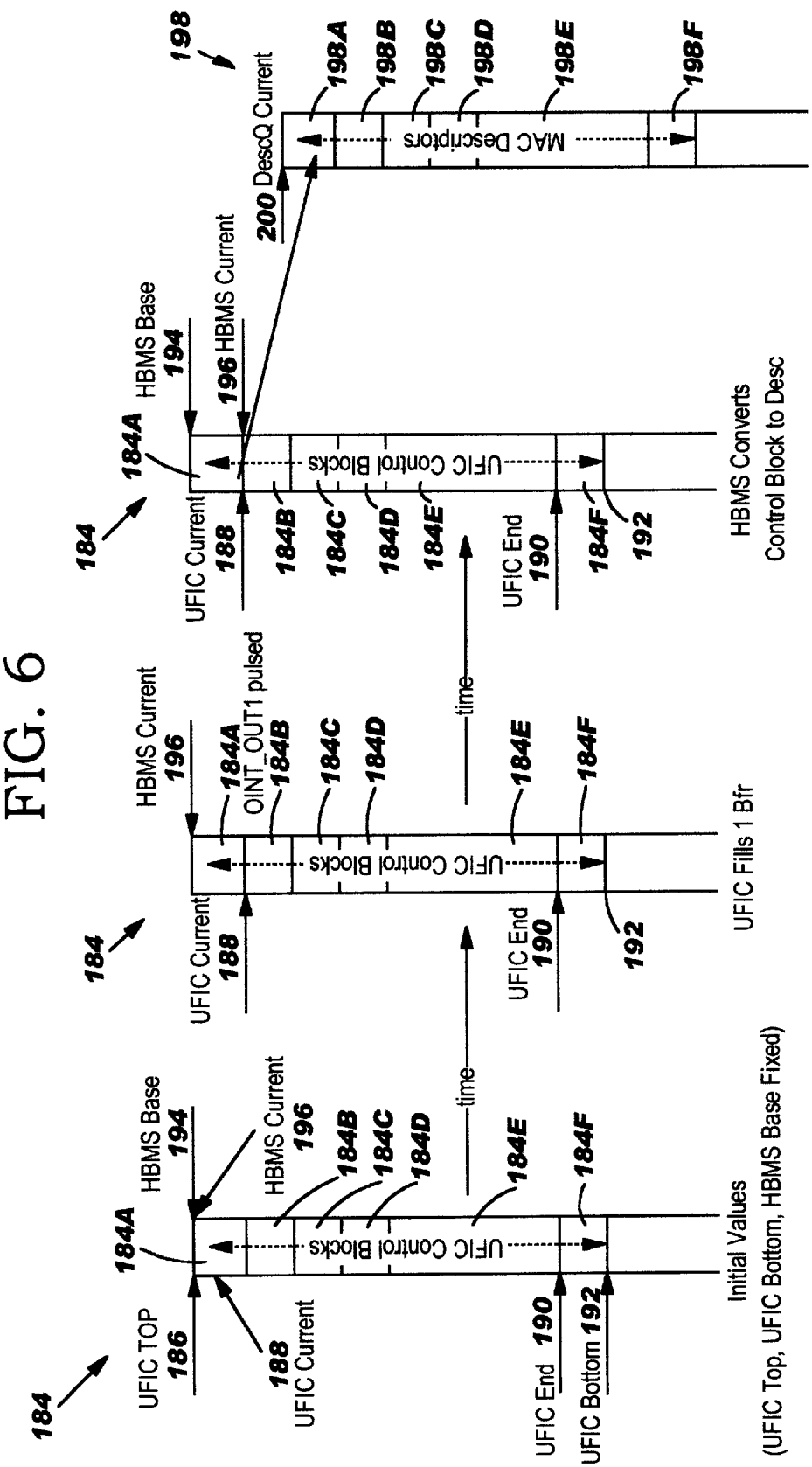
FIGS. 6 and 7 show block diagrams illustrating the manipulation of the transmit data structures.
Figure 7:
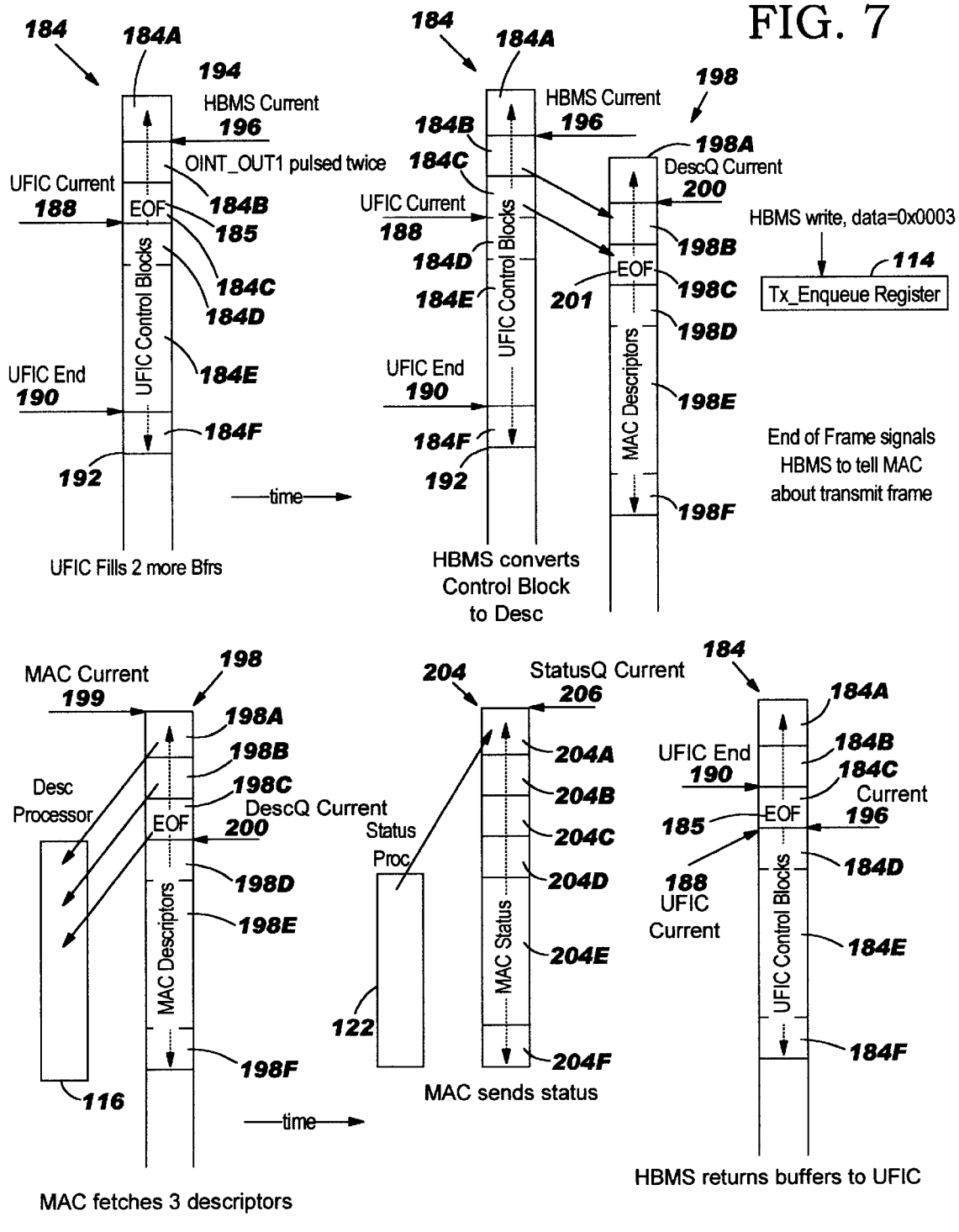

With reference now to the figures and in particular with reference to FIGS. 6 and 7, an example of the manipulation of the transmit data structures (i.e. UFIC chip 16 to MAC chip 40) is shown. The hardware buffer management system 26 must manipulate the transmit data structures (descriptors to or from the MAC chip 40, control blocks from the UFIC chip 16 during frame traffic as illustrated in FIGS. 6 and 7. At the left side of FIG. 6, UFIC control blocks 184 are initialized and shown with initial values. The UFIC top 186, the UFIC bottom 192, and the base pointer 194 are fixed. The UFIC control blocks 184 are filled from top to bottom. FIG. 6 shows that the UFIC top pointer 186 and the base pointer 194 are both located at the top of the top control block 184A. FIG. 6 also shows that the UFIC bottom pointer 192 is located at the bottom of the bottom control block 184F. The initialized control blocks 184 in FIG. 6 show that the UFIC current pointer 188 and the current pointer 196 are both pointing at the first top control block 184A.

In the center of FIG. 6, one data frame buffer is filled into the UFIC control blocks 184. The UFIC current pointer moves below the control block 184A and above the control block 184B since the one data frame has been filled into the control block 184A. All of the other pointers remain at the same location. The QINT_OUT1 is pulsed. At the right side of FIG. 6, the hardware buffer management system 26 converts the filled UFIC control block 184A to a MAC descriptors block 198A in the MAC buffer descriptors 198. A current pointer 196 is moved below the UFIC control block 184A when the conversion has been completed. The MAC buffer descriptors 198 has a descriptors (DescQ) current pointer 200 initially located at the top of the descriptor block 198A. This descriptors current pointer 200 is moved below the descriptors block 198A when the conversion has been completed.

Referring to FIG. 7 at the top left side, two more data frames are filled into the UFIC control blocks 184B and 184C of the UFIC control blocks 184. The UFIC current pointer 188 is moved below the UFIC control block 184C and the end of frame (EOF) indicator 185 and above the UFIC control block 184D. Thus, the filling of the UFIC control blocks 184A, 184B, and 184C indicates that an end of frame (EOF) has been reached. All of the other pointers remain at the same location. In the center of FIG. 7, the hardware buffer management system 26 converts the filled UFIC control block 184A to a MAC descriptors block 198A in the MAC buffer descriptors 198. A current pointer 196 is moved below the UFIC control block 184C (i.e. moved down two more blocks) when the conversion has been completed. At the top right side of FIG. 7, the end of frame (EOF) indicator 201 signals the hardware buffer management system 26 to write the data frame from the descriptors 110 of the SRAM 20 to the Tx_Enqueue Register 114 of the MAC chip 40.

Referring to the left lower side of FIG. 7, The descriptor processor 116 of the MAC chip 40 retrieves and fetches the data frame in three descriptor blocks 198A, 198B, and 198C. The MAC buffer descriptors 198 has a descriptors (DescQ) current pointer 200 located below the descriptor block 198A before the retrieval of the data frame by the MAC chip 40. This descriptors current pointer 200 is moved below the descriptors block 198C when the retrieval of the data frame by the MAC chip 40 has been completed. At the center of FIG. 7, the status processor 122 of the MAC chip 40 sends the status of the data frame transfer to the MAC status block 204A of MAC status block 204. The MAC status block 204 has a StatusQ current pointer 206 originally located at the top of the MAC status block 204A. The StatusQ current pointer 206 moves down below the MAC status block 204A after the status processor 122 has sent the status to the MAC status block 204. At the lower right side of FIG. 7, the hardware buffer management system 26 frees up the UFIC control blocks 184 by returning the buffers to the UFIC chip 16. The UFIC end pointer 190 is moved above the end of frame (EOF) indicator 185 and at the UFIC control block 184C in order to free up the buffers.

Figure 8:
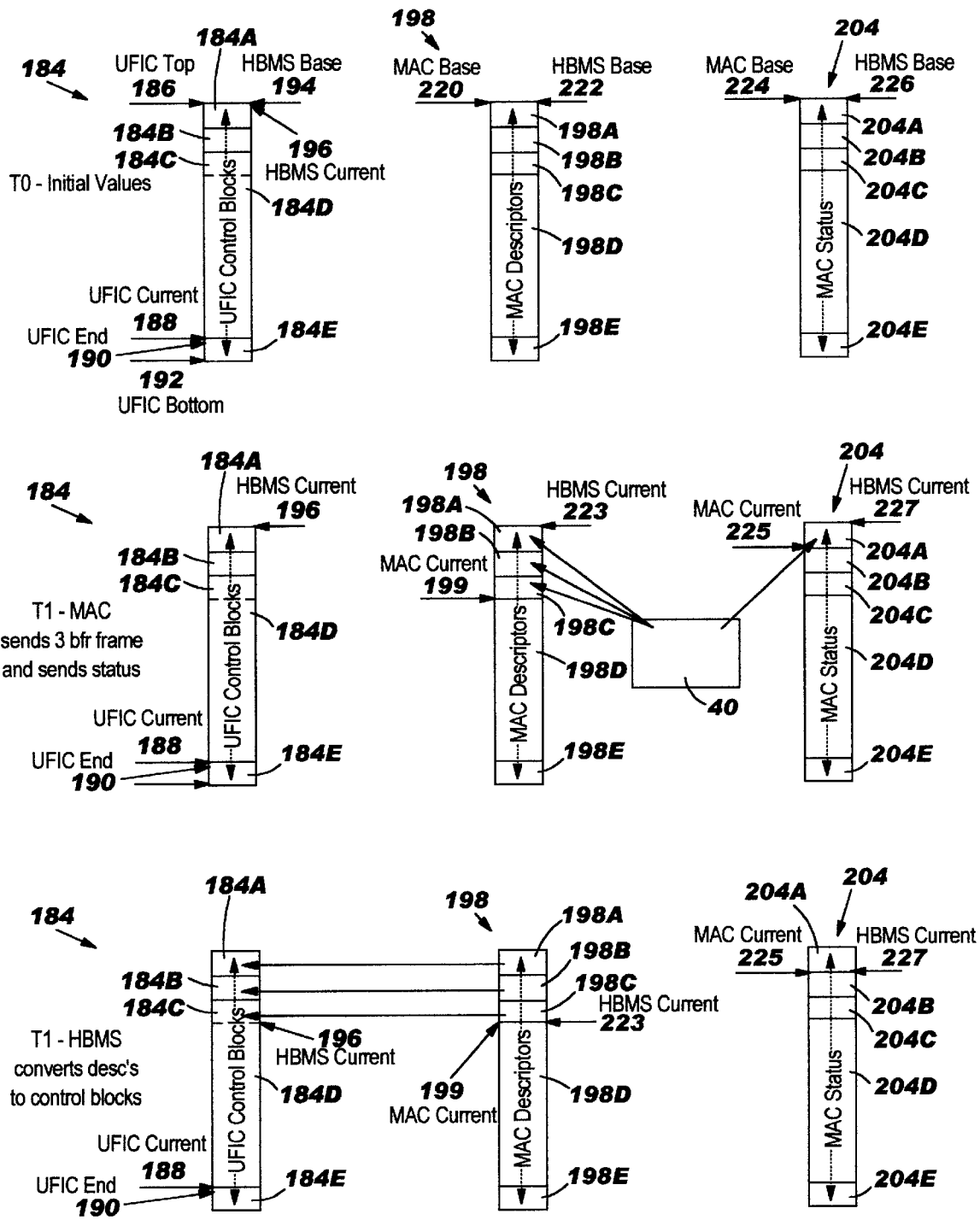
FIG. 8 shows block diagrams illustrating the manipulation of the receive data structures.
Figure 8:
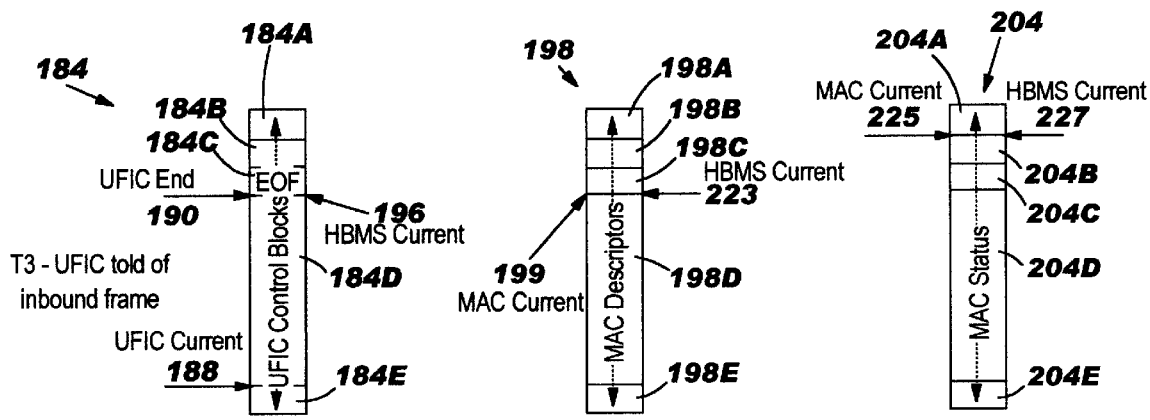

With reference now to the figures and in particular with reference to FIG. 8, an example of the manipulation of the receive data structures is shown. The hardware buffer management system 26 must manipulate the receive data structures (descriptors from or to the MAC chip 40, control blocks to or from the UFIC chip 16) during the frame traffic as illustrated in FIG. 8. At T0 which is the first row of FIG. 8, the UFIC control blocks 184, the MAC buffer descriptors 198, and the MAC status block 204 are shown with initial values. The UFIC control blocks 184 has a UFIC top pointer 186 above the UFIC control block 184A. The UFIC current pointer 188 and the UFIC end pointer 190 are above the UFIC control block 184E. The UFIC bottom pointer is below the UFIC control block 184E. The base pointer 194 and the current pointer 196 are at the top of the UFIC control block 184A. The MAC base pointer 220, the MAC current pointer 199, and the base pointer 222 are at the top of the MAC descriptors 198A of the MAC buffer descriptors 198. The MAC base pointer 224 and the base pointer 226 are located above the MAC status block 204A of MAC status block 204.

At T1, the MAC chip 40 sends a three (3) data buffer frame to the MAC buffer descriptors 198 and sends the status to the MAC status block 204. FIG. 8 shows in the second row that a 3 data buffer frame is sent to the MAC descriptor blocks 198A, 198B, and 198C. The MAC current pointer 199 is moved below the block 198C after the transfer of the data frame to the descriptors 198 occurs. The MAC chip 40 also transfers to the MAC status block 204 the "transfer" status of the data buffer frame to the MAC buffer descriptors 198. At T2 which is the third row in FIG. 8, the hardware buffer management system 26 converts the data frame in the descriptor blocks 198A, 198B, and 198C to UFIC format and respectively stores them into the UFIC control blocks 184A, 184B, and 184C of the UFIC control blocks 184. The current pointer 223 is moved below the MAC descriptor 198C after the data frame has been transferred to the UFIC control blocks 184.

At T3 which is the fourth row in FIG. 8, the UFIC is advised of the inbound frame at UFIC blocks 184A, 184B, and 184C after the data frame has been transferred to the UFIC blocks 184. The UFIC end pointer 190 is placed below the UFIC control block 184C. The remaining pointers at the MAC buffer descriptors 198 and the MAC status block 204 are maintained at the same location.

Therefore, as frames are received from the external token ring interface 42 (i.e. data transferring from PCI to LAN), MAC chip 40 transfers the frame into the data buffer at SRAM 20 and updates the control block descriptors 110 with the appropriate status. When a frame is complete, hardware buffer management system 26 examines the status field 112 in the control block sent by MAC chip 40. When a good status indication is detected, the hardware buffer management system 26 creates an UFIC control block 184 in the data buffer at SRAM 20. The UFIC chip 16 then performs the lookup and correctly routes the frame to the proper destination as data is taken out of the data buffer at SRAM 20 and placed on the LAN switch bus axis 14.

Also, as data is received from the internal bus axis 14 in the outbound direction at the UFIC chip 16, the hardware buffer management system 26 waits for the end-of-frame indication at the UFIC chip 16. The MAC buffer descriptors 110 are created at the data buffers at SRAM 20 so the MAC chip 40 is able to transfer the data from the data buffer memory to itself as bus master on the PCI interface at the user network system 44. As frame transfers are complete to the MAC chip 40, both the UFIC chip 16 and the MAC buffer descriptors 110 are freed for re-use by the hardware buffer management system 26. The full duplex operation at 100 Mbps in each direction is supported by the hardware buffer management system 26 and the PCI bus coupled to user network system 44.

While the invention has been particularly shown and described with reference to a preferred embodiment, it will be understood by those skilled in the art that various changes in form and detail may be made therein without departing from the spirit and scope of the invention.

What is claimed is:

1. A method for transferring data between a first and a second system comprising the steps of:

transferring and storing data from the first system to a data buffer memory, allowing the data transferred from the first system to the data buffer memory to be converted and read by the second system, transferring and storing data from the second system to the data buffer memory, allowing the data transferred from the second system to the data buffer memory to be converted and read by the first system, wherein the transfer and storage of data from the first and second systems includes multiplexing and managing transfer and storage of the data into the data buffer memory, said multiplexing and managing comprising dividing usage of the data buffer memory by:

coupling a first communication system to the first system and coupling a second communication system to the second system, wherein the second communication system includes a transmit enqueue, a descriptor processor, a first-in first-out buffer, a protocol engine, and a status processor, dividing the data buffer memory into a frame buffer block, a transmit and receive queue block, a descriptors block, and a status block, using the frame buffer block to hold control blocks for the first communication system, using the transmit and receive queue block to hold transmit control blocks, using the descriptors block to hold descriptors from the second communication system, and using the status block to hold status data, and wherein said transferring and storing data from the first system to the data buffer memory further includes:

sending a data frame from the one of the two different systems to the one communication system, placing the data frame into the frame buffer block, updating the transmit control blocks in the transmit queue regarding the data frame transferred from the first communication system to the frame buffer block, reading in the updated transmit control blocks from the transmit queue, convert the updated control blocks to a descriptor format by providing descriptor format information for translating and converting between the first communication system and the second communication system, storing the descriptor format information into the descriptors block, writing to the transmit enqueue to inform the second communication system of the data frame in the frame buffer block to be converted, using the descriptor processor to fetch the descriptor format information for the data frame from the descriptors block, using the descriptor processor for advising the first-in first-out buffer that the data frame is ready to be transferred and converted, for initiating transfer and storing of the data frame from the frame buffer block, and for using the descriptor format information in the descriptors block to translate and store the data frame converted into a data format for the second communication system into the first-in first-out buffer, sending the converted data frame from the first-in first out buffer to an interface for the second communication system and then to the another of the two different systems, sending and updating a transfer status from the protocol engine to the status processor, posting and updating the status data with the transfer status from the status processor to the status block, analyzing the transfer status in the status block, freeing up the control block for the first communication system within the frame buffer block, updating an end pointer within the frame buffer block for the first communication system when the transfer status is recognized as a transfer complete status, and posting an interrupt if an unexpected event occurs during transfer and conversion of the data frame.

2. The method according to claim 1, further comprising the steps of:

coupling first communication system to the first system, and coupling the first communication system to the data buffer memory.

3. The method according to claim 2, further comprising the step of: initializing the first communication system.

4. The method according to claim 1, further comprising the steps of: coupling the second communication system to the second system.

5. The method according to claim 1, further comprising the step of: alternating use of the data buffer memory between the steps of transferring and storing data from the fist system to a data buffer memory and transferring and storing data from the second system to the data buffer memory.

6. The method according to claim 1, wherein the first system is a personal computer interface system and wherein the second system is an internal switching fabric of a local area network system.

7. The method according to claim 1, wherein the second communication system further comprises a transmit enqueue, a descriptor processor, a first-in first-out buffer, a protocol engine, and a status processor, and wherein the step of transferring and storing data from the second system to the data buffer memory further comprises the steps of:

initializing the descriptors in the descriptors block by using a central processing unit, initializing the transmit and receive queue with a maximum count value using the central processing unit, using the data buffer management system to update the transmit and receive queue during a traffic flow, retrieving the descriptors from the descriptors block by using the descriptor processor, using the descriptor processor for initializing a data transfer and for advising that the buffer space is available for the data frame, receiving the data frame from the second system through an other system interface, storing the data frame from the second system into the first-in first out buffer, forwarding the data frame from the first-in first out buffer to the frame buffer block, sending a transfer status to the status processor, posting and sending the transfer status to the status data in the status block, interrogating the status in the status block wherein the status indicates that the data frame transferred to the frame buffer block is to be read, reading the descriptors to determine where the data frame is based on where the second communication system has stored the data frame, generating a receive control block in the transmit and receive queue block for the first communication system, informing the first communication system of the data frame received by the frame buffer block by updating an end pointer of the receive control block, determining whether a status in the status block indicated an error, posting and sending an interrupt to the central processing unit if the status has indicated the error, and forwarding the data frame from the frame buffer block to the first system if the status has not indicated the error.

* * * * *